US012644018B2

(12) United States Patent
Wei

(10) Patent No.: US 12,644,018 B2
(45) Date of Patent: Jun. 2, 2026

(54) CYANOACRYLATE COMPOSITIONS

(71) Applicant: Henkel AG & Co. KGaA, Duesseldorf (DE)

(72) Inventor: Xinyu Wei, Newington, CT (US)

(73) Assignee: Henkel AG & Co. KGaA, Duesseldorf (DE)

( * ) Notice: Subject to any disclaimer, the term of this patent is extended or adjusted under 35 U.S.C. 154(b) by 10 days.

(21) Appl. No.: 18/436,317

(22) Filed: Feb. 8, 2024

(65) Prior Publication Data

US 2024/0271007 A1 Aug. 15, 2024

Related U.S. Application Data

(63) Continuation-in-part of application No. PCT/US2022/040499, filed on Aug. 16, 2022.

(60) Provisional application No. 63/260,282, filed on Aug. 16, 2021.

(51) Int. Cl.

*B32B 41/00* (2006.01)
*C08F 222/32* (2006.01)
*C08K 5/00* (2006.01)
*C09J 4/06* (2006.01)

(52) U.S. Cl.

CPC ............. *C09J 4/06* (2013.01); *C08F 222/322* (2020.02); *C08K 5/005* (2013.01)

(58) Field of Classification Search

CPC . C09J 4/06; C09J 4/00; C09J 2400/166; C09J 2433/00; C09J 5/00; C09J 133/18; C09J 133/20; C09J 7/28; C09J 11/06; C09J 137/00; C08F 222/322; C08F 122/32; C08F 2/44; C08K 5/005
USPC .................... 156/60, 64, 350, 351, 378, 379
See application file for complete search history.

(56) References Cited

U.S. PATENT DOCUMENTS 3,832,334 A 8/1974 O et al.
3,975,422 A 8/1976 Buck
4,012,402 A 3/1977 Buck
4,139,693 A 2/1979 Schoenberg
4,196,271 A 4/1980 Kimura et al.
4,450,265 A 5/1984 Harris
4,532,293 A 7/1985 Ikeda et al.
4,556,700 A 12/1985 Harris et al.
4,622,414 A 11/1986 Mckervey
4,636,539 A 1/1987 Harris et al.
4,695,615 A 9/1987 Harris et al.
4,718,966 A 1/1988 Harris et al.
4,837,260 A 6/1989 Sato et al.
4,855,461 A 8/1989 Harris et al.
4,906,317 A 3/1990 Liu
5,312,864 A 5/1994 Engelskirchen et al.
5,530,037 A 6/1996 Lambert et al.
6,096,848 A 8/2000 Gololobov et al.
6,607,632 B1 8/2003 Lambert et al.
8,303,705 B2 11/2012 Barnes et al.
9,783,714 B2 10/2017 Goff et al.
2014/0124137 A1 5/2014 Hedderman et al.
2014/0326407 A1 11/2014 Li
2017/0335151 A1* 11/2017 Ward ...................... C08L 35/04

FOREIGN PATENT DOCUMENTS

EP 0137849 A1 4/1985
WO 2010091975 A1 8/2010
WO 2014140798 A2 9/2014

OTHER PUBLICATIONS

H.V. Coover et al., Cyanoacrylate Adhesives, Handbook of Adhesives; 27, 463-77,I. Skeist, ed., Van Nostrand Reinhold, New York, 3rd ed. (1990).
G.H. Millet, "Cyanoacrylate Adhesives" in Structural Adhesives: Chemistry and Technology, S.R. Hartshorn, ed., Plenun Press, New York, p. 249-307 (1986).

* cited by examiner

*Primary Examiner* — Michael N Orlando
*Assistant Examiner* — Joshel Rivera
(74) *Attorney, Agent, or Firm* — Steven C. Bauman

(57) ABSTRACT

This invention relates to cyanoacrylate-containing compositions, which when cured provide improved bonding performance on aluminum substrates.

15 Claims, No Drawings

CYANOACRYLATE COMPOSITIONS

BACKGROUND

Field

This invention relates to cyanoacrylate-containing compositions, which when cured provide improved bonding performance on aluminum substrates.

Brief Description of Related Technology

Cyanoacrylate adhesive compositions are well known, and widely used as quick setting, instant adhesives with a wide variety of uses. See H. V. Coover, D. W. Dreifus and J. T. O'Connor, "Cyanoacrylate Adhesives" in *Handbook of Adhesives,* 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

There are few reported instances of efforts to improve the bonding of cyanoacrylate adhesive composition to aluminum substrates.

Yet numerous examples of the addition of certain anhydrides to cyanoacrylate compositions have been reported.

For instance, U.S. Pat. No. 3,832,334 is directed to the addition of maleic anhydride, which is reported to produce cyanoacrylate adhesives having increased thermal resistance (when cured) while preserving fast cure speed.

U.S. Pat. No. 4,196,271 is directed to tri-, tetra- and higher carboxylic acids or their anhydrides, which are reported to be useful for improving heat resistance of cured cyanoacrylate adhesives.

U.S. Pat. No. 4,450,265 is directed to the use of phthalic anhydride to improve heat resistance of cyanoacrylate adhesives. More specifically, the '265 patent is directed to and claims an adhesive composition comprising a polymerizable constituent the major part of which comprises at least one ester of 2-cyanoacrylic acid, characterized in that the composition additionally comprises a proportion of phthalic anhydride effective for favorably influencing the strength and/or durability of adhesive bonds formed from the composition, under exposure to moisture or elevated temperature. The effective amount is reported as 0.1% to 5.0%, such as 0.3% to 0.7%, by weight of the composition. The '265 patent reports the superiority of phthalic anhydride over compositions where no additive was used, and where maleic anhydride was used (though less pronounced in the case of stainless steel lap shears than in those of aluminium).

U.S. Pat. No. 4,532,293 is directed to the use of benzophenonetetracarboxylic acid or its anhydride to provide a superior heat resistance for cyanoacrylate adhesives.

More recently, U.S. Patent Application Publication No. 2014/0326407 (Li) is directed to a cyanoacrylate adhesive composition, comprising: (a) a cyanoacrylate component, (b) an anhydride, and (c) a maleimide-, itaconimide-, or nadimide-containing compound, where the anhydride may be phthalic anhydride or dimethyl maleic anhydride.

And U.S. Patent Application Publication No. 2014/0124137 (Hedderman) is directed to a cyanoacrylate adhesive composition, comprising: (a) a cyanoacrylate component, and (b) a hydrogenated anhydride, such as a hydrogenated phthalic anhydride, like a tetrahydrophthalic anhydride. The composition may also comprise a benzonitrile.

Despite these efforts, there has been a long standing, but unmet, desire to achieve more robust bonding performance from cyanoacrylate compositions on aluminum substrates. It would accordingly be quite advantageous to provide a solution to that desire.

SUMMARY

The present invention remedies the shortcomings on aluminum bonding performance of cyanoacrylate compositions by providing a cyanoacrylate composition, which when cured provides at least improved tensile strength, through broadly speaking the combination of (a) a cyanoacrylate component and (b) an aromatic multifunctional anhydride component, such as an aromatic dianhydride component.

This invention is also directed to a method of bonding together two substrates, at least one of which is constructed from aluminum, which method includes applying to at least one of the substrates a composition as described above, and thereafter mating together the substrates.

In addition, the present invention is directed to reaction products of the inventive compositions.

Also, the invention is directed to a method of preparing the inventive compositions.

The invention will be more fully understood by a reading of the section entitled "DETAILED DESCRIPTION", which follows.

DETAILED DESCRIPTION

As noted above, this invention is directed to a cyanoacrylate composition, which when cured provides improved aluminum bonding performance.

The cyanoacrylate component includes at least one cyanoacrylate monomer which may be chosen with a raft of substituents, such as those represented by $H_2C{=}C(CN)$—COOR, where R is selected from $C_{1-15}$ alkyl, alkoxyalkyl, cycloalkyl, alkenyl, aralkyl, aryl, allyl and haloalkyl groups. Desirably, the cyanoacrylate monomer is selected from at least one of methyl cyanoacrylate, ethyl-2-cyanoacrylate, propyl cyanoacrylates, butyl cyanoacrylates (such as n-butyl-2-cyanoacrylate), octyl cyanoacrylates, allyl cyanoacrylate, β-methoxyethyl cyanoacrylate and combinations thereof.

The cyanoacrylate component should be included in the compositions in an amount within the range of from about 50% to about 99.98% by weight, with the range of about 70% to about 95% by weight, of the total composition being desirable.

In addition to the cyanoacrylate component a multi-functional cyanoacrylate component may be included as well. Multi-functional cyanoacrylate components are ordinarily bis-cyanoacrylates, but may be tri-functional, tetra-functional or penta-functional as well.

Bis-cyanoacrylates are embraced by structure I

I

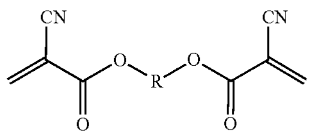

where R in structure I is a linkage selected from $(CH_2)_n$, with n being 2, 3, 4, 5, 6, 8, 9, 10, or 12, such as a linear or branched chain alkylene. Bis-cyanoacrylates of this sort may be prepared through a transesterification reaction using an appropriate diol to yield the alkylene center segment for "R". Desirable examples of these bis-cyanoacrylates include 1,10-decanediol bis-cyanoacrylate, 1,8-octanediol bis-cyanoacrylate, and 1,6-hexane bis-cyanoacrylate. An appropriate synthetic method to yield such bis-cyanoacrylates may be found generally in U.S. Pat. No. 3,975,422 (Buck), U.S. Pat. No. 4,012,402 (Buck), and U.S. Pat. No. 6,096,848 (Gololobov), and International Patent Publication No. WO 2010/091975.

When used, the multi-functional cyanoacrylate component should be included in the compositions in an amount within the range of from about 5% to about 30% by weight, with the range of about 10% to about 20% by weight, of the total composition being desirable.

The aromatic multifunctional anhydride component may be chosen from a host of materials, such as an aromatic dianhydride component. For instance, the aromatic dianhydride component may be embraced by compounds within structure II below:

II

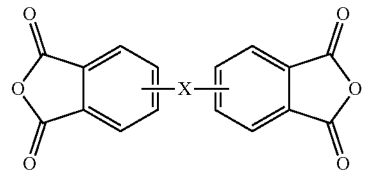

wherein X is selected from O; S; C═O; S═O; O═S═O; -; $CRR^1$ (wherein R and $R^1$ are independent of one another and are selected from the group consisting of H, $C_1$-$C_3$ alkyl and halogen); Y—Ar—$Y^1$ [wherein Y and $Y^1$ are independently selected from O, S, -, and $CRR^1$ (wherein R and $R^1$ are as described above), and Ar is an aromatic ring or a fused ring system comprising at least one aromatic ring]; Y—Ar—$Y^1$—$Ar^1$—$Y^2$ (wherein Y, Ar, and $Y^1$ are as described above, $Ar^1$ is selected from Ar, and $Y^2$ is selected from Y or $Y^1$, and Ar is as described above); and $(O═CO)_n$—Z (wherein Z is $C_1$-$C_6$ alkylene.

More specifically, the aromatic dianhydride component within the following structure:

IIA

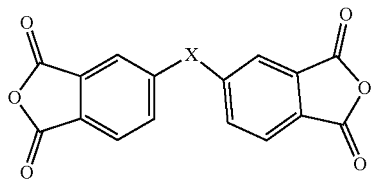

wherein X is as defined above.

Illustrative species of the aromatic dianhydride component include (some having acronyms beneath the respective structure):

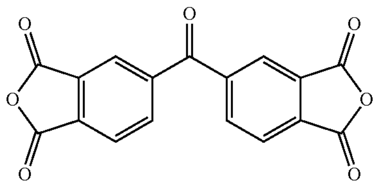

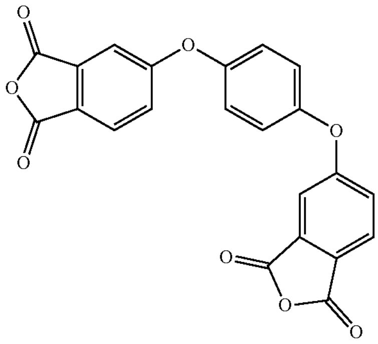

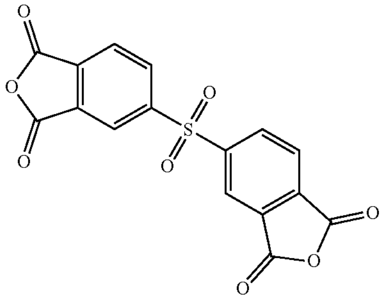

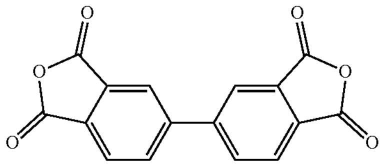

s-BPDPA

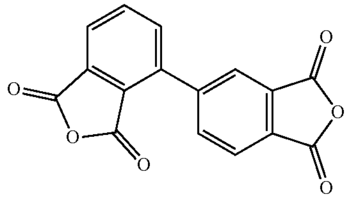

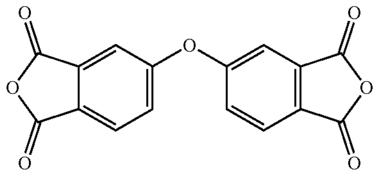

ODPA

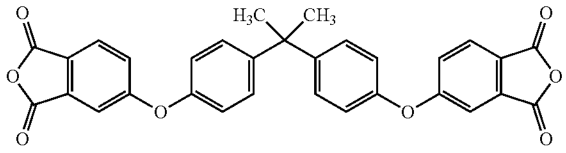

Bis-A DPA

-continued

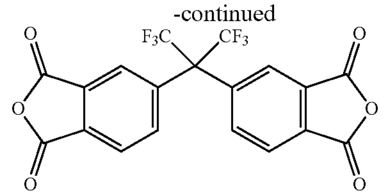

and

6FDPA

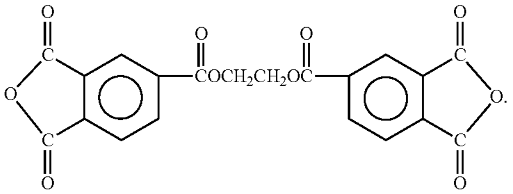

The aromatic multi-functional anhydride component should be present in the composition in an amount of from about 0.05 percent by weight to about 5 percent by weight, such as about 0.1 percent by weight to about 1 percent by weight.

Accelerators may also be included in the inventive cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof.

Of the calixarenes and oxacalixarenes, many are known and are reported in the patent literature. See e.g., U.S. Pat. Nos. 4,556,700, 4, 622, 414, 4, 636, 539, 4, 695, 615, 4,718,966, and 4,855,461, the disclosures of each of which are hereby expressly incorporated herein by reference.

For instance, as regards calixarenes, those within the following structure are useful herein:

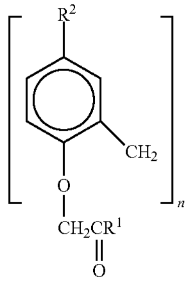

where $R^1$ is alkyl, alkoxy, substituted alkyl or substituted alkoxy; $R^2$ is H or alkyl; and n is 4, 6 or 8.

One particularly desirable calixarene is tetrabutyl tetra [2-ethoxy-2-oxoethoxy]calix-4-arene.

A host of crown ethers are known. For instance, examples which may be used herein either individually or in combination, include 15-crown-5,18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5,3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated herein by reference.

Of the silacrowns, again many are known, and are reported in the literature.

Specific examples of silacrown compounds useful in the inventive compositions include:

dimethylsila-11-crown-4

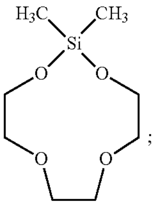

;

dimethylsila-14-crown-5

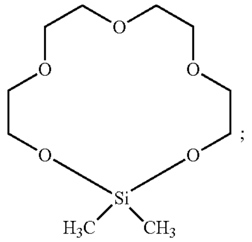

; and dimethylsila-17-crown-6

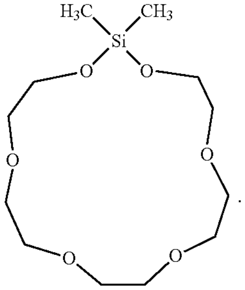

.

See e.g., U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein by reference, as hydroxyl group derivatives of an α, β or □□-cyclodextrin would be appropriate choices as an accelerator component.

For instance, poly(ethylene glycol) di(meth)acrylates suitable for use herein include those within the following structure:

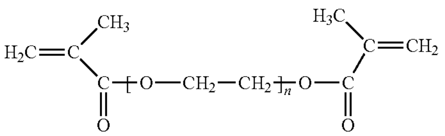

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure:

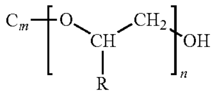

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01% to about 10% by weight, with the range of about 0.1 to about 0.5% by weight being desirable, and about 0.4% by weight of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g., U.S. Pat. Nos. 5,530,037 and 6, 607, 632, the disclosures of each of which are incorporated herein by reference.

Other additives may be included in the inventive cyanoacrylate compositions, such as certain acidic materials (like citric acid), thixotropy or gelling agents, thickeners, dyes, and combinations thereof.

In another aspect of the invention, there is provided a method of bonding together two substrates, at least one of which is constructed of aluminum, which method includes applying to at least one of the substrates a composition as described above, and thereafter mating together the substrates for a time sufficient to permit the adhesive to fixture.

In yet another aspect of the invention, there are provided cured products of the so-described compositions.

In still another aspect of the invention, there is provided a method of preparing the so-described compositions. The method includes providing a cyanoacrylate component and combining therewith an aromatic multifunctional anhydride component.

The invention will be further illustrated by the examples which follow.

EXAMPLES

Cyanoacrylate compositions were prepared from ethyl-2-cyanoacrylate and a series of aromatic dianhydrides. In one sample, ethyl-2-cyanoacrylate and phthalic anhydride are chosen as a control, Sample A.

In Table 1 below, four additional samples (B-E) were prepared with the identified constituents in the noted amounts.

TABLE 1

| Constituents | | Sample/Amt. (wt %) | | | | |
|---|---|---|---|---|---|---|
| Type | Identity | A | B | C | D | E |
| CA | Ethyl-2-CA | Balance | Balance | Balance | Balance | Balance |
| Anhydride | Phthalic | 0.1 | — | — | — | — |
| | ODPA | — | 0.1 | — | — | — |
| | s-BPDPA | — | — | 0.1 | — | — |
| | 6FDPA | — | — | — | 0.1 | — |
| | Bis-A DPA | — | — | — | — | 0.1 |
| Thickener | PMMA | 9.6 | 9.6 | 9.6 | 9.6 | 9.6 |

Each of Samples A-E was applied to aluminum lap shears, and bonded assemblies were prepared for performance evaluation.

As shown in Table 2 below, when applied to aluminum substrates, the samples exhibit the following performance in terms of tensile strength [$N/mm^2$] after a room temperature cure of 24 hours:

TABLE 2

| Sample | | | | |
|---|---|---|---|---|
| A | B | C | D | E |
| 4.1 | 10.1 | 7.7 | 7.4 | 6.0 |

Each of Samples B-E show an improvement in tensile strength performance on aluminum substrates as contrasted to Sample A. Samples B-E contain at a 0.1 percent by weight level a species of the genus of the aromatic multifunctional anhydride, whereas Sample A contains at that level phthalic anhydride as a control. Samples B-E show at least a fifty percent improvement over the control and upwards of a two hundred fifty percent improvement with refence to Sample B.

In Table 3 below, three samples (Samples F-H) were prepared.

TABLE 3

| Constituents | | Samples | | |
|---|---|---|---|---|
| Type | Identity | F | G | H |
| CA | Ethyl-2-CA | Balance | Balance | Balance |
| Anhydride | Phthalic | 0.1 | — | — |
| | ODPA | — | 0.1 | 0.5 |
| Thickener | PMMA | 6.5 | 6.5 | 6.5 |

Each of Samples F-H was applied to aluminum lap shears, and bonded assemblies were prepared for performance evaluation.

As shown in Table 4 below, when applied to aluminum substrates, the samples show the following performance in terms of tensile strength [$N/mm^2$] after a room temperature cure of 24 hours:

TABLE 4

| Samples | | |
|---|---|---|
| F | G | H |
| 3.3 | 8.6 | 11 |

Each of Samples G-H show an improvement in tensile strength performance on aluminum substrates as contrasted to Sample F. Samples G-H contain 0.1 percent by weight and 0.5 percent by weight level of ODPA as a species of the genus of the aromatic multifunctional anhydride, whereas Sample F contains phthalic anhydride as a control at a 0.1 percent by weight level. Sample G shows more than a one hundred percent improvement over the control and Sample H shows a two hundred fifty percent improvement over the control, albeit at a higher loading level.

What is claimed is:

1. A cyanoacrylate adhesive composition, comprising:

(a) a cyanoacrylate component, and (b) an aromatic multifunctional anhydride component, wherein the aromatic multifunctional anhydride component is an aromatic dianhydride component

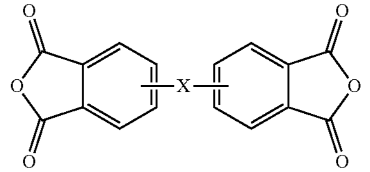

selected from the group consisting of:

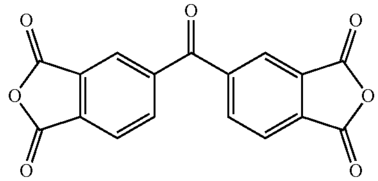

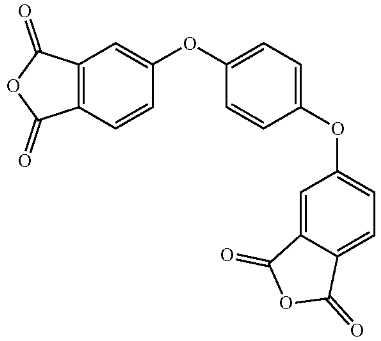

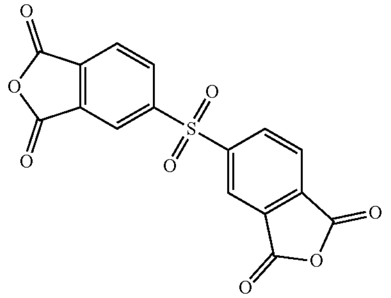

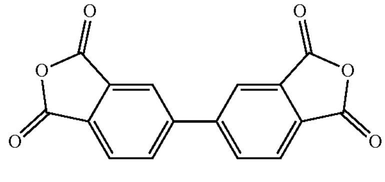

-continued

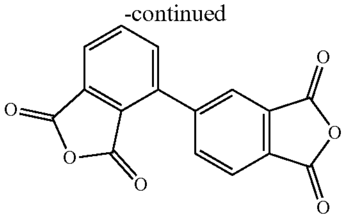

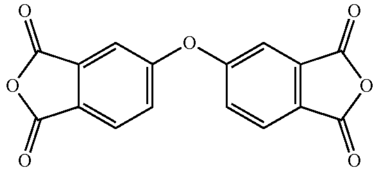

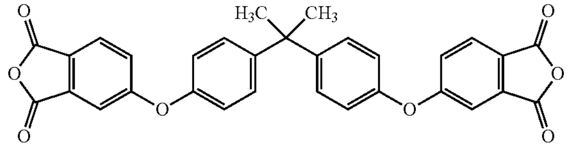

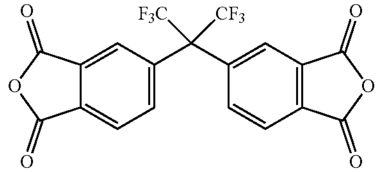

and

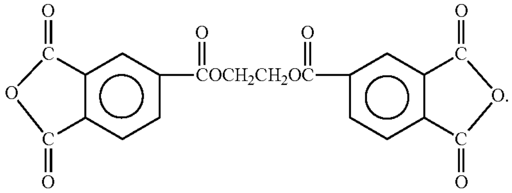

2. The composition according to claim 1, wherein the wherein the aromatic multifunctional anhydride component is an aromatic dianhydride component within the following structure:

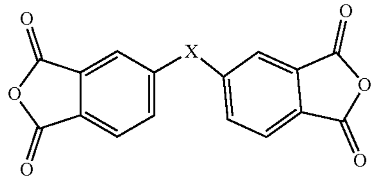

wherein X is as defined above.

3. The composition according to claim 1, wherein the cyanoacrylate component is selected from the group consisting of methyl cyanoacrylate, ethyl-2-cyanoacrylate, propyl cyanoacrylates, butyl cyanoacrylates, octyl cyanoacrylates, allyl cyanoacrylate and β-methoxyethyl cyanoacrylate.

4. The composition according to claim 1, further comprising a multi-functional cyanoacrylate component.

5. The composition according to claim 4, wherein the multi-functional cyanoacrylate component is embraced by structure I

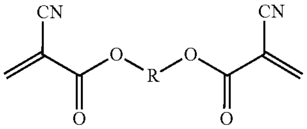

I wherein R in structure I is a linkage selected from $(CH_2)_n$, with n being 2, 3, 4, 5, 6, 8, 9, 10, or 12.

6. The composition according to claim 4, wherein the multi-functional cyanoacrylate component is selected from the group consisting of 1,10-decanediol bis-cyanoacrylate, 1,8-octanediol bis-cyanoacrylate, and 1,6-hexanediol bis-cyanoacrylate.

7. The composition of claim 1, further comprising a stabilizing amount of an acidic stabilizer and a free radical inhibitor.

8. The composition according to claim 1, further comprising an accelerator component.

9. The composition according to claim 8, wherein the accelerator component is selected from the group consisting of calixarene, oxacalixarene, silacrown, cyclodextrin, crown ether, poly(ethyleneglycol) di(meth)acrylate, ethoxylated hydric compound, and combinations thereof.

10. The composition according to claim 9, wherein the crown ether is selected from members within the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6, and 1,2-benzo-1,4-benzo-5-oxygen-20-crown-7 and combinations thereof.

11. The composition according to claim 1, further comprising additives selected from the group consisting of tougheners, shock resistant additives, thixotropy conferring agents, thickeners, dyes, and combinations thereof.

12. Reaction products of the composition according to claim 1.

13. A method of bonding together two substrates, at least one of which is constructed from aluminum, comprising the steps of:

applying a cyanoacrylate-containing composition according to claim 1, to at least one of the substrates and mating together the substrates for a time sufficient to permit the adhesive to fixture.

14. A method of preparing a cyanoacrylate-containing composition according to claim 1, comprising the steps of:

providing a cyanoacrylate component, and combining therewith with mixing an aromatic multi-functional anhydride component.

15. The composition according to claim 1, wherein cured products thereof show an improvement in tensile strength performance on aluminum substrates as contrasted to compositions without the claimed anhydride of (b).

* * * * *